United States Patent [19]
Kondo

[11] Patent Number: 5,111,787
[45] Date of Patent: May 12, 1992

[54] ELECTRONIC CONTROL DEVICE FOR MOTOR VEHICLE USE

[75] Inventor: Katsuhiko Kondo, Hyogo, Japan
[73] Assignee: Mitsubishi Denki K.K., Tokyo, Japan
[21] Appl. No.: 737,878
[22] Filed: Jul. 30, 1991

[30] Foreign Application Priority Data

Aug. 20, 1990 [JP] Japan ............... 2-220643

[51] Int. Cl.⁵ .............................. F02D 41/08
[52] U.S. Cl. ...................... 123/339; 123/585
[58] Field of Search ............ 123/339, 585, 589

[56] References Cited

U.S. PATENT DOCUMENTS

| | | | |
|---|---|---|---|
| 4,635,607 | 1/1987 | Yasuoka et al. | 123/339 X |
| 4,760,824 | 8/1988 | Sakurai | 123/585 X |
| 4,763,623 | 8/1988 | Sasaki | 123/339 |
| 4,771,749 | 9/1988 | Kiuchi et al. | 123/339 |
| 4,966,112 | 10/1990 | Shimomura | 123/339 |
| 5,031,595 | 7/1991 | Heck et al. | 123/339 |
| 5,054,450 | 10/1991 | Oota et al. | 123/339 |

FOREIGN PATENT DOCUMENTS 61-13102 4/1986 Japan .
61-26082 6/1986 Japan .
61-58694 12/1986 Japan .

*Primary Examiner*—Willis R. Wolfe
*Attorney, Agent, or Firm*—Sughrue, Mion, Zinn, Macpeak & Seas

[57] ABSTRACT

An electronic control device for motor vehicle comprises, a plurality of sensors for detecting the operation conditions of a motor vehicle, control device for calculating control data for the motor vehicle in view of output signals of the sensors, and for outputting control signals according to the control data, solenoid valve controlled in view of the control signals outputted by the control device, and failure detecting device for monitoring the state of the solenoid valve every predetermined period of time to determine that the solenoid valve and a drive circuit thereof are out of order, when the solenoid valve is held in the same state for a predetermined period of time.

6 Claims, 2 Drawing Sheets

ELECTRONIC CONTROL DEVICE FOR MOTOR VEHICLE USE

BACKGROUND OF THE INVENTION

This invention relates to an electronic control device for motor vehicle use, and more particularly to determination as to whether or not a duty-driven solenoid valve and its drive circuit are out of order.

In general, with an electronic control device for motor vehicle engine use, as disclosed by Japanese Patent Application Publication No 13102/1986 or 26082/1986, the control duties of solenoid valves adapted to adjust the quantity of air bypassing the throttle valve and the EGR data are calculated according to data such as the quantity of intake air and the number of revolutions per minutes of the engine, and the solenoid valves are controlled according to the control duties thus calculated.

In an electronic control device of this type, an air cleaner is provided upstream of an air intake passageway connected to an engine, and an air flow sensor, an air temperature sensor and a throttle valve are provided in place downstream of the air cleaner. The throttle valve is provided with a throttle degree-of-opening sensor for detecting the degree of opening of the throttle. A bypass passageway is connected to the air intake passageway to bypass the throttle valve. A solenoid valve is connected to the bypass passageway at the middle so as to adjust the quantity of air flowing in the bypass passageway. A surge tank is provided downstream of the throttle valve in the air intake passageway, and an intake manifold is provided downstream of the surge tank. Injectors are provided near the suction ports of the cylinders of the engine. Furthermore, suction valves are provided for the cylinders of the engine. A water temperature sensor is provided for a cooling water passageway which is provided around the cylinders. The intake manifold is coupled through an exhaust gas circulating passageway to an exhaust passageway. An EGR valve is connected to the exhaust gas circulating passageway. A speed change position controlling solenoid valve is provided for a transmission gear coupled to the engine.

The device has a control unit receives the output signals of the above-described air flow sensor, throttle degree-of-opening sensor, air temperature sensor and water temperature sensor. The control unit further receives the output signals of a crank angle sensor mounted on the distributor, and a neutral position detecting sensor for detecting the no-load of the engine, and the output signals of a turbine sensor mounted on the transmission gear, a vehicle speed sensor, and a shift switch for detecting a shift lever's selection range. The control unit calculates fuel injection data, bypass air adjustment data and EGR data mainly according to the output signals of the air flow sensor, the crank angle sensor, the water temperature sensor and the air temperature sensor, and turns on and off or duty-drives the injector, the bypass air adjusting solenoid valve, and the EGR valve according to the data thus calculated.

The control unit selects a most suitable speed change position according to the output signals of the throttle degree-of-opening sensor, the turbine sensor, the vehicle speed sensor and the shift switch, and applies a pulse signal to the speed change position controlling solenoid valve to turn on and off or duty-drives the latter so that the speed change position thus selected be taken quickly.

In the duty drive of each of the above-described solenoids, a timer (particularly a PWM (pulse width modulation) timer) is employed, which is provided inside or outside of a CPU built in the control unit. The employment of the timer results in the advantage that the duty control can be achieved independently of the execution of program by the CPU, and therefore the load applied to the CPU can be decreased as much, and the duty control can be performed with high accuracy.

If, in the above-described electronic control device, the solenoid valve and its drive circuit become out of order, then the exhaust gas may be deteriorated, or running the motor vehicle may become difficult, or the speed change position may be unstable. Accordingly, it is essential to detect the failure of the solenoid valve and the drive circuit, to perform a failsafe operation. That is, it is necessary to monitor the state of the solenoid valve at all times. For this purpose, a method may be employed in which an interruption is carried out whenever the timer for duty-driving the solenoid valve turns on or off the solenoid, to determine whether or not the solenoid valve operates correctly.

However, this failure detecting method gives rise to another problem that a great load is applied to the CPU. In the case where the above-described PWM timer is employed, generally the CPU is not so designed as to perform the interruption with the above-described timing, and therefore it is rather difficult to determine whether or not the solenoid valve and the drive circuit are out of order.

SUMMARY OF THE INVENTION

An object of this invention is to eliminate the above-described difficulties accompanying a conventional electronic control device for motor vehicle use. More specifically, an object of the invention is to provide an electronic control device for motor vehicle use which determines whether or not a duty-driven solenoid valve and its drive circuit are out of order without applying a load to the CPU, thereby to perform a failsafe operation when they become out of order.

The foregoing object of the invention has been achieved by the provision of an electronic control device for motor vehicle use which monitors the state of a solenoid valve every predetermined period of time, and, when the solenoid valve is maintained in the same state for a predetermined period of time, determines that the solenoid valve and its drive circuit are out of order.

As was described above, with the electronic control device of the invention, the state of the solenoid valve is monitored every predetermined period of time, and when the solenoid valve is held in the same state for the predetermined period of time, it is determined that the solenoid valve and its drive circuit are out of order. Accordingly, the device can quickly determine it without applying a load to the CPU whether or not the solenoid valve and its drive circuit are out of order, and can perform a failsafe operation immediately when they become out of order. Thus, with the device of the invention, the motor vehicle can be safely controlled when driven.

DETAILED DESCRIPTION OF THE PREFERRED EMBODIMENTS

One preferred embodiment of this invention will be described with reference to the accompanying drawings.

Figure 1:
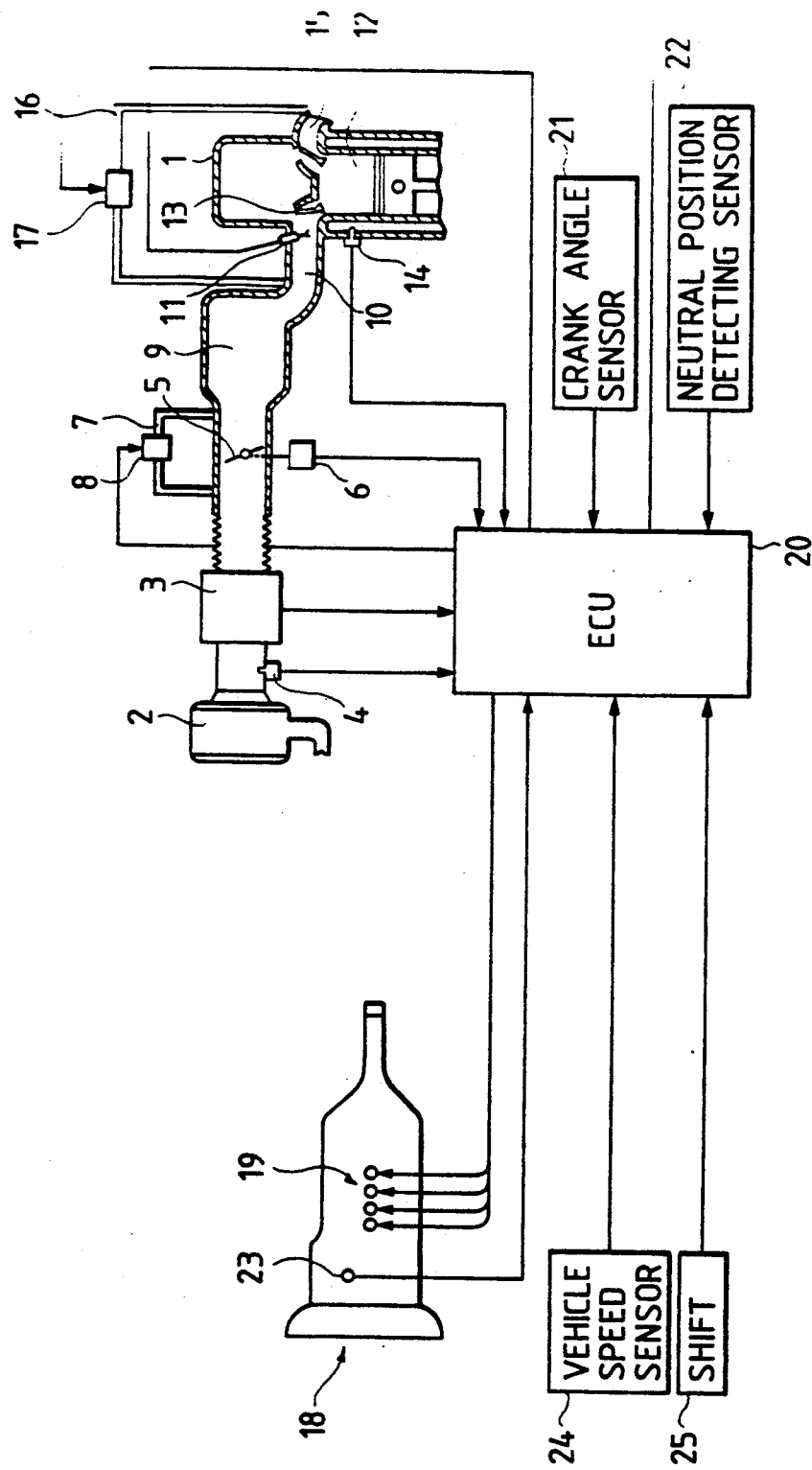
FIG. 1 is an explanatory diagram showing the entire arrangement of one embodiment of this invention.

FIG. 1 shows the entire arrangement of the embodiment of the invention.

In the embodiment, an air cleaner 2 is provided upstream of an air intake passageway connected to an engine 1, and an air flow sensor 3, an air temperature sensor 4 and a throttle valve 5 are provided in place downstream of the air cleaner 2. The throttle valve 5 is provided with a throttle degree-of-opening sensor 6 for detecting the degree of opening of the throttle 5. A bypass passageway 7 is connected to the air intake passageway to bypass the throttle valve 5. A solenoid valve 8 is connected to the bypass passageway 7 at the middle so as to adjust the quantity of air flowing in the bypass passageway. A surge tank 9 is provided downstream of the throttle valve 5 in the air intake passageway, and an intake manifold 10 is provided downstream of the surge tank 9. Injectors 11 are provided near the suction ports of the cylinders of the engine. Furthermore, suction valves 13 are provided for the cylinders 12 of the engine 1. A water temperature sensor 14 is provided for a cooling water passageway which is provided around the cylinders 12. The intake manifold 10 is coupled through an exhaust gas circulating passageway 16 to an exhaust passageway 15. An EGR valve 17 is connected to the exhaust gas circulating passageway 16. A speed change position controlling solenoid valve 19 is provided for a transmission gear 18 coupled to the engine 1.

A control unit 20 receives the output signals of the above-described air flow sensor 3, throttle degree-of-opening sensor 6, air temperature sensor 4 and water temperature sensor 14. The control unit 20 further receives the output signals of a crank angle sensor mounted on the distributor, and a neutral position detecting sensor for detecting the no-load of the engine, and the output signals of a turbine sensor 23 mounted on the transmission gear 18, a vehicle speed sensor 14, and a shift switch 25 for detecting a shift lever's selection range. The control unit 20 calculates fuel injection data, bypass air adjustment data and EGR data mainly according to the output signals of the air flow sensor 3, the crank angle sensor 21, the water temperature sensor 14 and the air temperature sensor 4, and turns on and off or duty-drives the injector 11, the bypass air adjusting solenoid valve 8, and the EGR valve 17 according to the data thus calculated.

The control unit 20 selects a most suitable speed change position according to the output signals of the throttle degree-of-opening sensor 6, the turbine sensor 23, the vehicle speed sensor 24 and the shift switch 25, and applies a pulse signal to the speed change position controlling solenoid valve 19 to turn on and off or duty-drives the latter 19 so that the speed change position thus selected be taken quickly.

Figure 2:
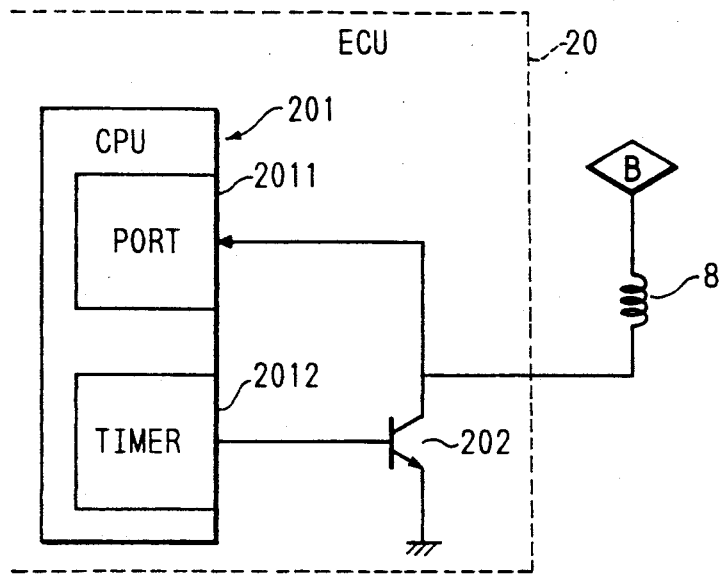
FIG. 2 is a circuit diagram, partly as a block diagram showing a solenoid valve drive circuit in the embodiment.

FIG. 2 shows a solenoid valve drive section. As shown in FIG. 2, the control unit 20 comprises a microprocessor or CPU 201 including a port 2011 and a timer 2012 such as a PWM timer; and a drive circuit 202 which obtains from the output of the timer 2012 a duty operated according to a predetermined control program. The drive circuit 202 is to drive the bypass air adjusting solenoid valve 8. The operation of the solenoid valve 8 is read through the port 2011 of the CPU 201. When, in this case, the timer 2012 outputs a high level signal, the drive circuit 202 is rendered conductive (on), as a result of which the solenoid valve 8 is activated, and a low level signal is applied to the port 2011. When, on the other hand, the timer 2012 output a low level signal, the drive circuit 202 is rendered non-conductive (off), as a result of which the solenoid valve 8 is deenergized, and a high level signal is applied to the port 2011.

Figure 3:
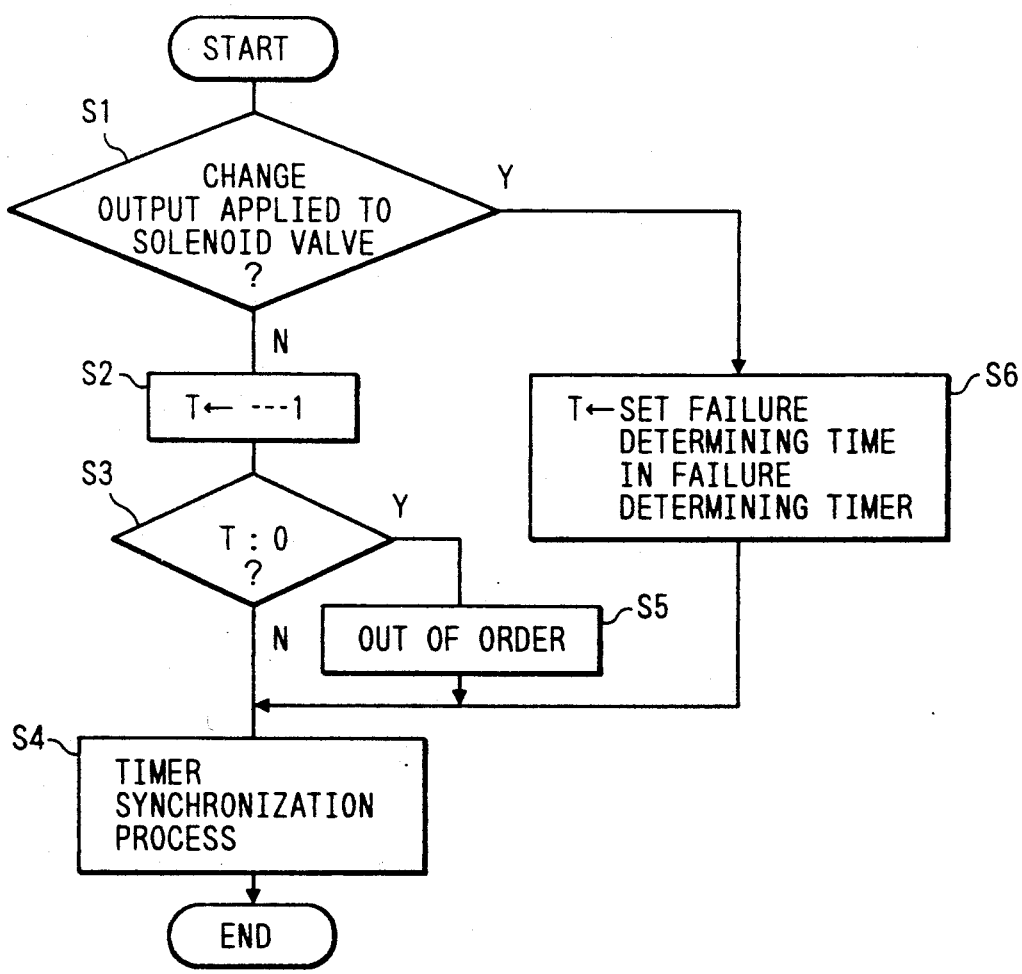
FIG. 3 is a flow chart for a description of the control in the embodiment.

FIG. 3 is a flow chart for a description of a part of the control in the embodiment which is carried out every predetermined period of time which is much shorter than the duty period.

In Step S1, the state of the port 2011 is read, so as to determine whether or not the output applied to the solenoid valve 8 is changed. If "Yes"; that is, if the level of the port 2011 is different from the preceding one, it is determined that the control is normal, because in this case the "on" state of the solenoid valve 8 is changed into "off" state, or the "off" state is changed into "on" state. Therefore, Step S6 is effected.

In Step S6, a failure determining time (T) is set in a failure determining timer (2012). Thereafter, Step S4 is effected. In this case, the failure determining time (T) is equal to or longer than the duty period.

When, in Step S1, it is determined that the level of the port 2011 is the same as the previous one, then Step S2 is effected. In Step S2, the value of the timer T is decreased. Thereafter, in Step S3, it is determined whether or not the value of the timer T is zero. If not zero, it is determined that the control is normal, and Step S4 is effected.

When the value of the timer T is zero (T=0), it is determined that the state of the solenoid valve 8 is held unchanged for a period of time longer than the duty period, and in Step S5 it is determined that the solenoid valve 8 or its drive circuit 202 is out of order, wire-broken or short-circuited. In this case, a process due to the failure determination or a failsafe operation is carried out, and then Step S4 is effected.

In Step S4, other timer synchronization processes are carried out, such that the output signals of the air flow sensor 3 and the throttle degree-of-opening sensor 6 are sampled. Then, the control is ended.

In the above-described embodiment, it is determined whether or not the bypass air adjusting solenoid valve 8 and its drive circuit 202 is out of order. However, it should be noted that it can be determined in the same manner whether or not the other solenoid valves and their drive circuits are out of order.

In the above-described embodiment, the technical concept of the invention is applied to the system in which the fuel injection control and the speed change control are carried out with only one control unit 20. However, the technical concept of the invention can be applied to a system in which a plurality of controls are carried out with a plurality of control units.

As was described above, with the electronic control device of the invention, it is determined whether or not a duty-driven solenoid valve and its drive circuit are out of order, by monitoring them every predetermined period of time. Therefore, no great burden is applied to the CPU, and yet the failure can be detected quickly;

and in the case where the solenoid valve and its drive circuit become output of order, the failsafe control can be performed without delay.

What is claimed is:

1. An electronic control device for motor vehicle comprising:
   a plurality of sensors for detecting the operation conditions of a motor vehicle;
   control means for calculating control data for said motor vehicle in view of output signals of said sensors, and for outputting control signals according to said control data;
   solenoid valve controlled in view of said control signals outputted by said control means; and
   failure detecting means for monitoring the state of said solenoid valve every predetermined period of time to determine that said solenoid valve and a drive circuit thereof are out of order, when said solenoid valve is held in the same state for a predetermined period of time.

2. An electronic control device for motor vehicle as claimed in claim 1, wherein said failure detecting means includes a control unit including CPU having a port portion and timer portion.

3. An electronic control device for motor vehicle as claimed in claim 1, wherein said solenoid valve is controlled by said drive circuit.

4. An electronic control device for motor vehicle as claimed in claim 1, wherein said control means includes said failure detecting means.

5. A method of detecting failure of an electronic control device for motor vehicle in which said device comprises a plurality of sensors for detecting the operation conditions of a motor vehicle; control means for calculating control data for said motor vehicle in view of output signals of said sensors, and for outputting control signals according to said control data; solenoid valve controlled in view of said control signals outputted by said control means; and failure detecting means for monitoring the state of said solenoid valve every predetermined period of time to determine that said solenoid valve and a drive circuit thereof are out of order, when said solenoid valve is held in the same state for a predetermined period of time, said method comprising the steps of:
   reading an output signal of a port provided with said failure detecting means;
   determining whether o not said output signal applied to said solenoid valve is changed;
   if said output level of said port is different from the preceding one;
   (a) determining that the control of solenoid valve is normal;
   (b) setting a failure determining time "T" in a failure determining timer provided with said failure detecting means;
   if said output level of said port is the same as the previous one;
   (a) decreasing the value of a timer "T";
   (b) determining whether or not the valve of said timer "T" is zero;
   if the value of said timer T is not zero;
   (a) determining that the control of said solenoid valve is normal:
   if the value of said timer is zero:
   (a) determining that the state of said solenoid valve is held unchanged for a period of time than a duty period; and
   (b) determining that one of said solenoid valve and its drive circuit is out of order.

6. A method claimed in claim 5, wherein said duty period is not more than said failure determining time.

* * * * *